United States Patent [19]

Landi et al.

[11] Patent Number: 5,039,567
[45] Date of Patent: Aug. 13, 1991

[54] RESILIENT PANEL HAVING ANISOTROPIC FLEXING CHARACTERISTICS AND METHOD OF MAKING SAME

[75] Inventors: Curtis L. Landi; Susan L. Wilson, both of Mountain View, Calif.

[73] Assignee: Supracor Systems, Inc., Sunnyvale, Calif.

[21] Appl. No.: 446,320

[22] Filed: Dec. 4, 1989

[51] Int. Cl.⁵ .............................................. B32B 3/12
[52] U.S. Cl. ...................................... 428/116; 156/197
[58] Field of Search ................. 428/116, 118, 73, 117; 156/197, 292

[56] References Cited

U.S. PATENT DOCUMENTS

| | | | |
|---|---|---|---|
| 2,887,425 | 5/1959 | Holland | 428/116 X |
| 3,007,834 | 11/1961 | Moeller et al. | 428/116 X |
| 3,018,205 | 1/1962 | Barut | 428/118 X |
| 3,483,070 | 12/1969 | Kennedy et al. | 428/118 |
| 3,556,917 | 1/1971 | Eakin et al. | 428/118 X |
| 3,664,906 | 5/1972 | Hartig | 428/118 X |
| 4,422,183 | 12/1983 | Landi et al. | 428/116 X |
| 4,485,568 | 12/1984 | Landi et al. | 428/116 X |

Primary Examiner—Henry F. Epstein
Attorney, Agent, or Firm—Rosenblum, Parish & Bacigalupi

[57] ABSTRACT

A resilient panel having anisotropic flexing characteristics in which thermal compression bonding techniques have been to laminate a plurality of sheets of thermoplastic polyurethane material together with bonds that are in strip form, spaced at regular intervals, and staggered between alternate sheets of material. The laminated stack was then cut into slices of appropriate thickness, and the slices were expanded to form a honeycombed core which, while held in spread apart disposition, was thermally pre-formed and made ready to receive facing materials. The facing materials were then thermal compression bonded to each side of the honeycombed core, and the panels were trimmed to assume their final dimensions.

12 Claims, 7 Drawing Sheets

RESILIENT PANEL HAVING ANISOTROPIC FLEXING CHARACTERISTICS AND METHOD OF MAKING SAME

BACKGROUND OF THE INVENTION

1. Field of the Invention

The present invention relates generally to methods of manufacture of flexible energy absorbing structures, and more specifically to a novel resilient, flexible, fusion bonded, honeycombed panel incorporating thermoplastic elastomer materials or the like and the method of manufacturing such apparatus.

2. Brief Description of the Prior Art

It is well known that honeycombed panels have heretofore been provided consisting of an array of hexagonal cells made of strips of flat material glue bonded together and nested so that each wall of one cell is shared with walls of adjacent cells to provide a structure which, depending upon the type of materials used, can vary between being quite rigid on the one hand and being flexible on the other. See for example, the U.S. patents to Barut U.S. Pat. No. 3,018,205, Eakin et al U.S. Pat. No. 3,556,917, and Kennedy et al U.S. Pat. No. 3,483,070. Whereas structures of the former type are suitable for making lightweight panels for use in walls, aircraft structures, boat hull structures, and other configurations where rigidity, strength and light weight characteristics are important, when crushed these structures exhibit little if any recovery and are thus permanently degraded. In structures of the latter type wherein the honeycombed material is flexible a cushioning structure can be provided which is resilient and energy absorbing.

Applications for the resilient structures are many and varied, as disclosed in the U.S. patents to Holland U.S. Pat. No. 2,887,425 Landi et al U.S. Pat. Nos. 4,422,183, and 4,485,568. As is pointed out in these patents, one way to manufacture a resilient honeycombed structure is to place a number of sheets or ribbons of flexible material in side-by-side relation, bonding them together intermittently using a vulcanization process or suitable adhesives. After the sheets are bonded together, the assembly is then severed to form core stacks of ribbons or strips intermittently bonded together at staggered intervals along the length of the strips. The thus bonded strips are then expanded in a lateral direction to create a honeycombed core to which layers of material are adhesively bonded to both faces of the core to form a structural unit.

Although such units are, in fact, superior to prior structures, they are expensive and difficult to manufacture in quantity due to complexities associated with the vulcanization and/or adhesive bonding and assembly techniques required. In addition, such structures suffer from other disadvantages including (1) poor bonding between core and facing materials; (2) core node failures after repetitive impacts or compressions; (3) limitations as to compatibility between materials used for core, facings and adhesives; (4) cosmetic degeneration of transparent facing materials caused by adhesive solvents; and perhaps most importantly, (5) the hazards associated with the use of the combustible and toxic adhesive solvents.

SUMMARY OF THE PRESENT INVENTION

It is therefore a principle objective of the present invention to provide a method of making a honeycombed structure which does not require the use of adhesives or solvents in the manufacturing process.

Another objective of the present invention is to provide a method of making a honeycombed panel using fusion bonding techniques which, in addition to eliminating the need for adhesives and solvents, further provides a reinforced cellular structure having more resilience than previous products.

Still another objective of the present invention is to provide a method of making a honeycombed panel utilizing thermoplastic (TP) and thermoplastic elastomeric (TPE) materials to produce a unique energy absorbing structure which does not degrade with repeated impact, and which has exceptional spring-back recovery characteristics.

Yet another objective of the present invention is to provide a method of making thermo formable honeycombed structures in a variety of shapes.

Briefly, a presently preferred embodiment of the method of the present invention includes the use of thermal compression bonding techniques to laminate a plurality of sheets of thermoplastic polyurethane material together with bonds that are in strip form, spaced at regular intervals, and staggered between alternate sheets of material. The laminated stack is then cut into slices of appropriate thickness, and the slices are expanded to form a honeycombed core which, while held in spread apart disposition, is thermally pre-formed and made ready to receive facing materials. The facing materials are then thermal compression bonded to each side of the honeycombed core, and the panels are trimmed to assume their final dimensions.

Among the numerous advantages of the present invention is that it provides a method which is readily used by unskilled labor, or in the alternative, is easily automated.

Another advantage is that the method provides an anisotropic three-dimensional structure of high integrity which has varying degrees of flex in its length, width, and thickness dimensions.

Still another advantage of the present invention is that it provides a structure which not only includes suitable flexibility and stability characteristics, but is also very lightweight and highly shock absorptive.

These and other objects and advantages of the present invention will no doubt become apparent to those skilled in the art after having read the following detailed description of the preferred embodiments which are illustrated in the several figures of the drawing.

DETAILED DESCRIPTION OF THE PREFERRED EMBODIMENT

Figure 1:
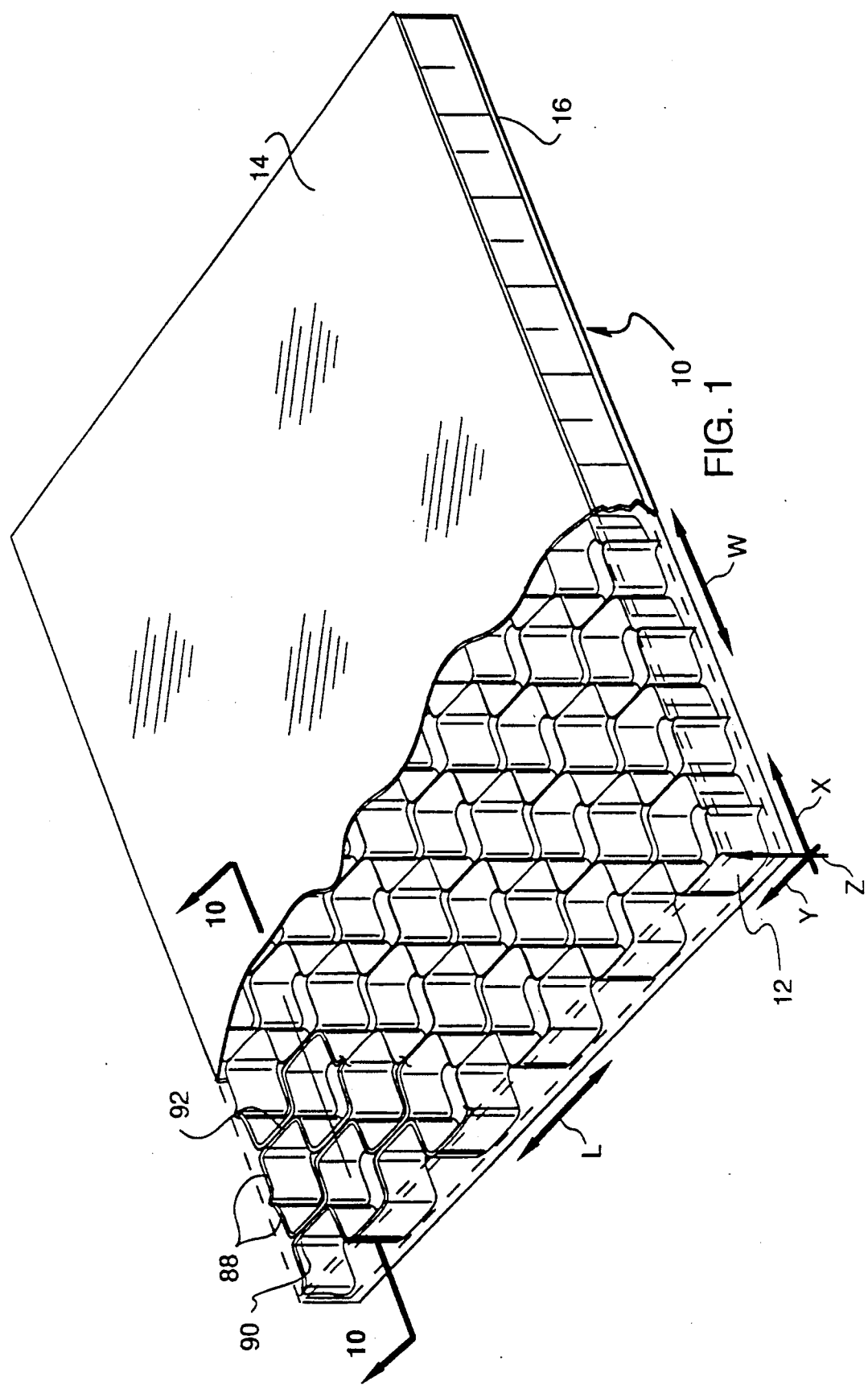
FIG. 1 is a perspective view illustrating a honeycombed panel of the type manufactured in accordance with the method of the present invention.

Referring now to the drawing, there is shown in FIG. 1 a honeycombed panel structure made in accordance with the present invention. As will be noted, the panel 10 includes a honeycomb-like core preferably made of bonded together and expanded strips 12 of plastic material to which facing sheets 14 and 16 of perhaps heavier gauge material are thermal compression bonded. The panel is an anisotropic three-dimensional structure having predetermined degrees of flex along the x, y, and z axes. Each cell is formed in part by four generally S-shaped wall segments each of which is shared with an adjacent cell. In addition, each cell shares a double thickness wall segment with two adjacent cells. Furthermore in one embodiment each cell comprises a hermetically sealed chamber.

Panel 10 has high tear and tensile strength and is highly resilient, with optimal compression load and shock absorbtion or dispersion characteristics, yet is extremely lightweight. Selected combinations of elastomeric material, honeycomb cell configuration, core thickness and facing material variables will determine the panel's characteristics of softness or hardness, resilient recovery rate and rigidity or flex as required for a particular application. The facing materials can be selected from a wide variety of films, including thermoplastic urethanes, foams, EVA's, elastomer impregnated fibers and fabrics, ceramics, metals, graphites, etc.

Figure 2:
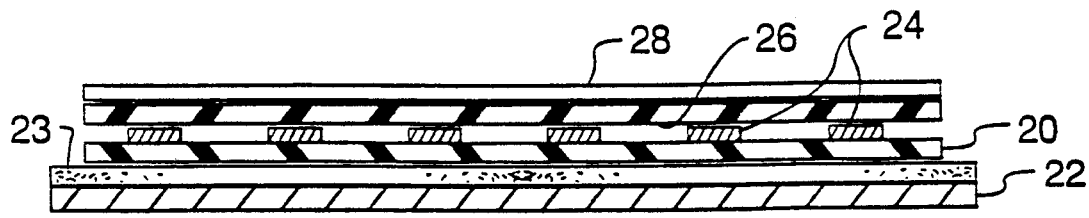
FIGS. 2 through 9 illustrate various mechanical steps followed in implementing the method of the present invention.

In FIGS. 2 through 9 of the drawing, the method of fabrication of the panel 10 in accordance with the present invention is illustrated in sequential detail. The first step in the sequence is to prepare a plurality of rectangular sheets of plastic material from which the core structure is to be fabricated. In one embodiment, the sheets are made of 0.012" thick thermoplastic polyurethane cut in 7"×19" rectangular pieces. As depicted in FIG. 2, the first sheet 20 is laid out upon the upper surface of a bonding fixture base 22 having a closed cell foam pad 23 forming its upper surface. A teflon coated fiberglass fabric spacer in the general shape of a comb having a plurality of teeth or fingers 24 is then placed over the sheet 20, and a second sheet 26 is placed over the comb fingers 24.

Figure 3:
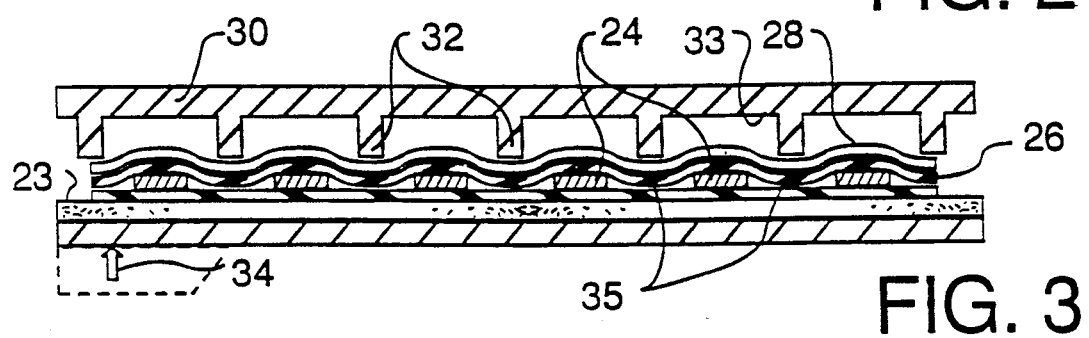

Next, a teflon impregnated fiberglass fabric sheet 28 is placed over sheet 26, and the base 22 is moved into position beneath a thermal bonding plate 30 having horizontally extending bonding ribs 32 as depicted in FIG. 3. Note that the lateral center-to-center spacing between the elongated ribs 32, the lengths of which extend into the plane of the drawing, is identical to the center-to-center spacing between the fingers 24 of the teflon spacer comb. As indicated, the depth of ribs 32 is selected so that little if any heat is transferred from the valleyed surfaces 33 to sheet 26. Furthermore, as depicted in FIG. 3, the fingers 24 are positioned laterally offset so as to be centered between the ribs 32.

As suggested by the arrows 34, the base 22 is then moved upwardly to cause the top surface of sheet 28 to engage ribs 32 and force the areas of the bottom surface of sheet 26 lying beneath the ribs 32 into compressive engagement with corresponding top surface areas of sheet 20. Since the plate 30 is elevated to a temperature of approximately 242 degrees Centigrade, heat will be transmitted from the ribs 30 and through sheet 28 to sheets 26 and 20, causing the contacting areas to be thermal compression bonded together. Note that the base travel (and thus the compression force), the temperature of plate 30, and the dwell time of each bonding cycle are carefully selected and controlled to achieve a desired bond quality. The function of the teflon comb fingers 24 is to maintain separation between sheets 20 and 26 in the unbonded sheet surface areas between the bonded surface areas.

Figure 4:
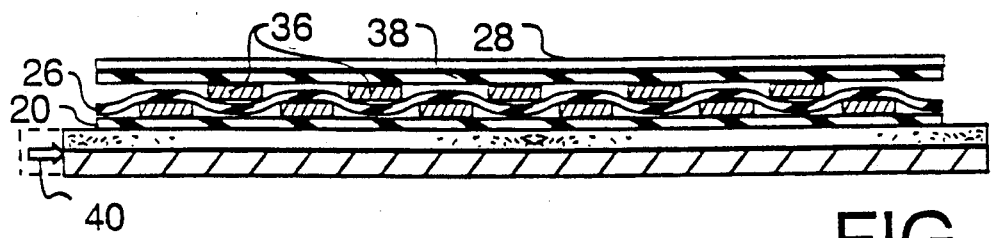
Figure 5:
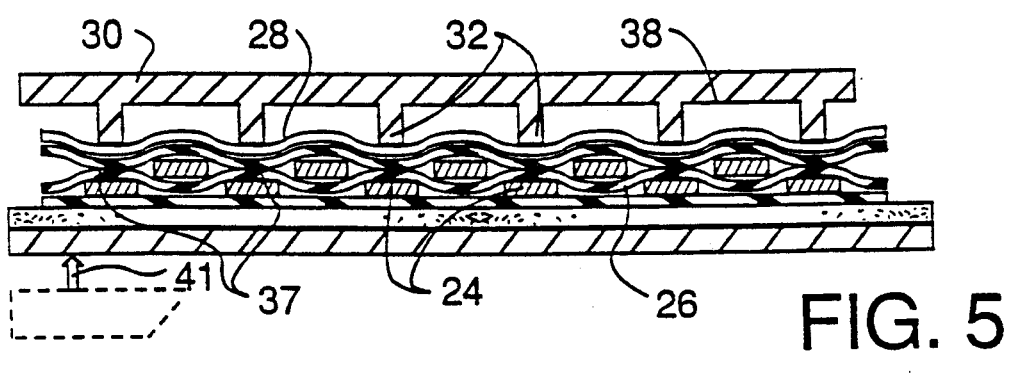

The base 22 is then lowered and, as depicted in FIG. 4, a second comb shaped separator is laid upon the upper surface of sheet 26, laterally offset relative to the first comb 24 so that its fingers 36 lie directly over the previously bonded areas of the sheets. A third sheet 38 of plastic material is then placed over the comb fingers 36, and the protective teflon sheet 28 is replaced over the top of sheet 38. The base 22 is thereafter shifted rightwardly, as indicated by arrow 40, a predetermined distance so that the areas of sheet 38 to be bonded to sheet 26 lie directly beneath ribs 32. As depicted in FIG. 5, the base 22 is then again moved upwardly to engage ribs 22 with sheet 28 and effect bonding between sheets 26 and 38. Note that the ribs 32 are now aligned directly over the comb fingers 24 and sandwich the rows of surface areas 37 of sheets 26 and 38 therebetween, causing such areas to be thermally bonded to each other.

Figure 6:
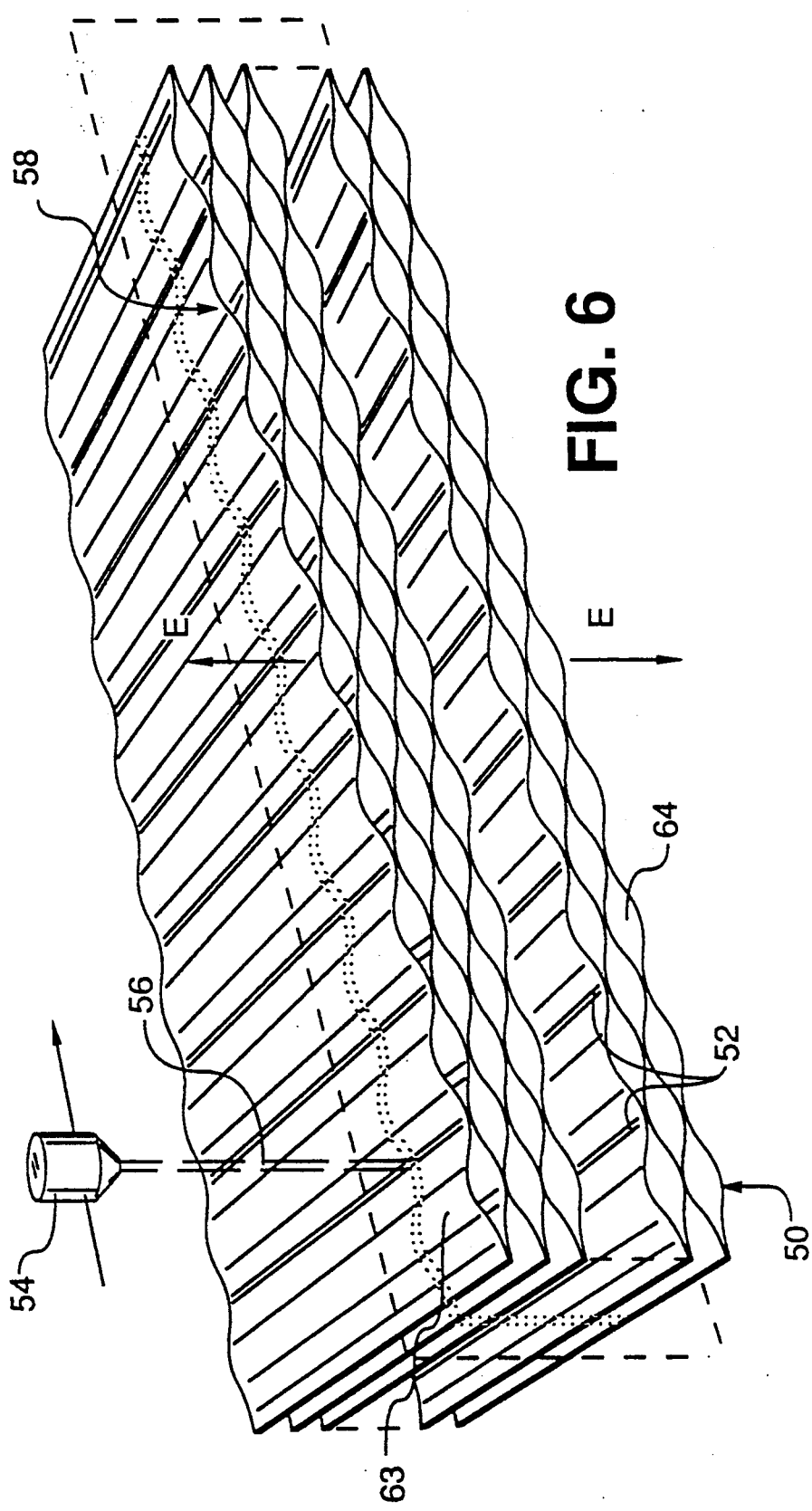

Although not depicted in detail, base 22 is then again lowered, the comb 24 is removed from between sheets 20 and 26, and after removal of sheet 28, is laid upon the upper surface of sheet 38. A fourth plastic sheet is subsequently laid thereupon along with the protective sheet 28, the base 22 is shifted leftwardly, and the assembly is again moved upwardly into contact with ribs 22 to complete the third bonding operation. The above-described process is successively repeated until a laminated assembly having a pre-selected number of laminations, such as is graphically represented in FIG. 6, is provided. In accordance with one preferred embodiment of the invention, the laminated block 50 includes 46 sheets of material bonded together along the bond row surface areas 52.

The laminated block 50 is then cut into a plurality of core strips. As depicted in FIG. 6, the strip cutting operation is carried out by a commercially available waterjet cutting machine, the jet nozzle 54 of which is caused to traverse along a line transverse to and in a plane normal to the lengths of the bonded row areas 52 so that its jet 56 causes a core strip 58 of approximately 5 mm thickness to be severed from the block 50. In this embodiment the longitudinal cuts are made with a kerf of approximately 7 mil. Alternatively, a shearing device or any other suitable means of cutting the block 50 into core strips could be utilized.

The next step is to expand the core strip 58 into a honeycomb configuration. This may be accomplished either manually, or mechanically by suitable mechanisms.

Figure 7:
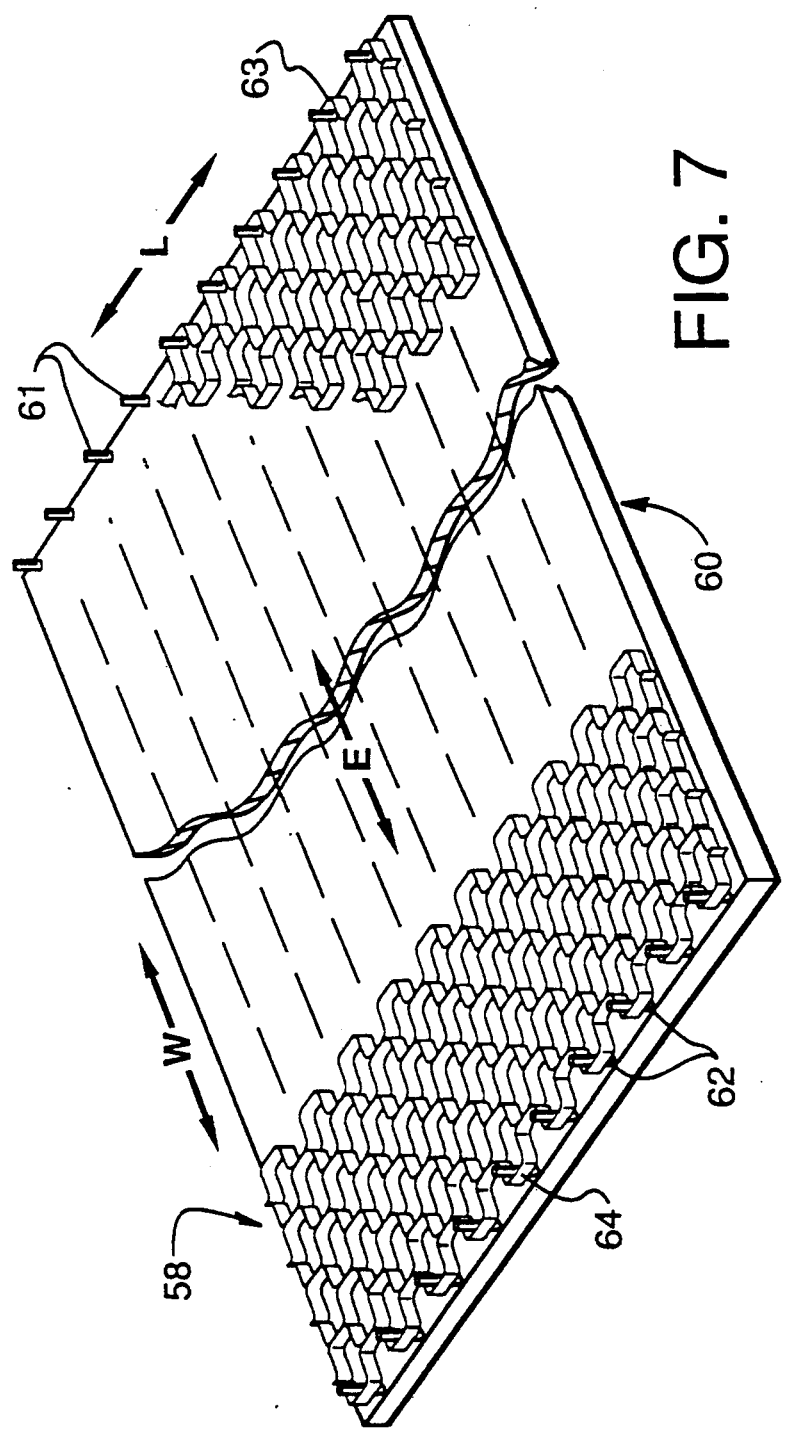

In accordance with a presently preferred embodiment, the core expansion operation is accomplished using metal spreader plates such as that depicted at 60 in FIG. 7. The plate 60 has predetermined width W and length L and includes along each length extending side a row of vertically projecting pins 61 and 62 disposed at regular intervals.

The core strip 58 is expanded by application of separating forces in the directions illustrated by the arrows E in FIG. 6, and the outermost row of cells on the upper side 63 are hooked over pins 61, while the cells on the lower side 64 are hooked over pins 62 as shown in FIG. 7. The spacing between pins in the L direction and the spacing between the rows of pins in the W direction are carefully selected in conjunction with the bond row width (as determined by the width of bonding plate ribs 32) and separation between bond (as determined by the spacing between ribs 32) such that, when the core is expanded and hooked over the pins 61 and 62, a particular cell configuration will be defined. Note for example that for a particular combination of a selected number of core sheets, bond width and bond spacing, a particular pin spacing in the L direction and a particular pin row spacing in the W direction might yield a cell configuration such as that illustrated in FIG. 7(a) wherein the cell dimension d1 in the core expansion direction is greater than the cell dimension d2 in the core strip length direction.

Figure 7C:
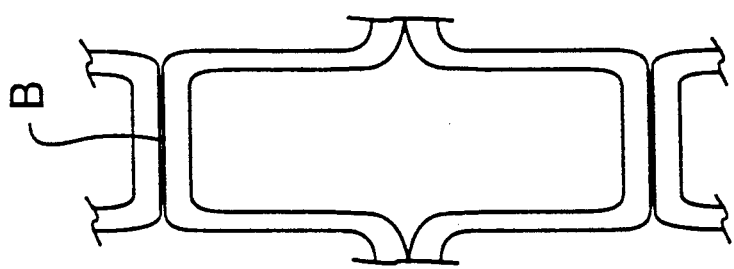
Figure 7B:
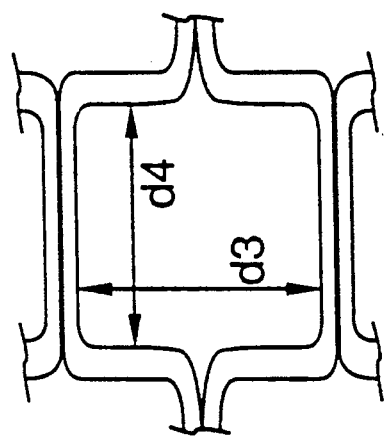
Figure 7A:
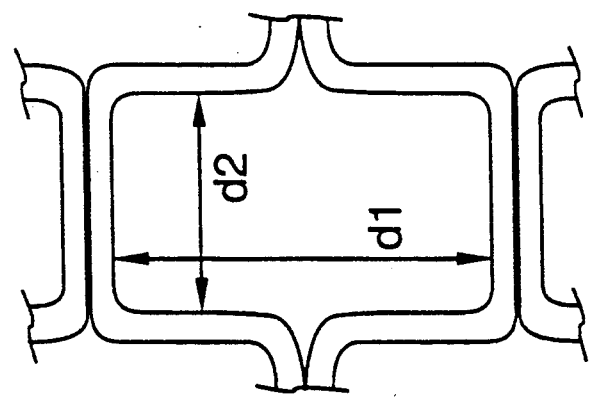

On the other hand, by increasing the spacing (in the direction) between pins in each row and decreasing the spacing (in the W direction) between pin rows, the same core when expanded will have cells with different cell dimensions d3 and d4, as depicted in FIG. 7(b). Moreover, by changing the bond row width B and the separation between bond rows, a still different cell configuration can be achieved as illustrated in FIG. 7(c). This is to say that by judicious selection of core bond width core bond spacing, spreader plate pin separation (in both L and W directions) and the type of materials used for the core one can provide a honeycombed core structure having particular desired characteristics.

Once the core 58 is positioned upon plate 60, as depicted in FIG. 7, an inspection is made to assure that the rows of cells are properly aligned and oriented. At this point, the core is ready for planarization in order to make it ready for receiving the facing materials. In this operation, the spreader plate 60 and attached core 58 are placed on a lifting bed 69 beneath a press plate 70 having a smooth lower surface which is aligned parallel to plate 60, and a 5 mil teflon sheet 72 is placed over the core 58.

Figure 8:
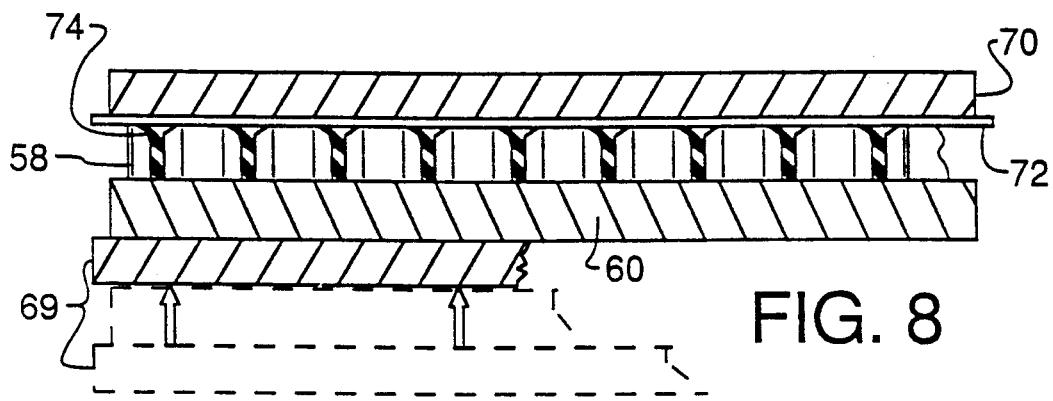

As indicated in FIG. 8, bed 69 is then raised causing core 58 and sheet 72 to be moved upwardly into engagement with plate 70 to effect one or more searing operations which have the effect of planarizing the upper surface of core 58 by deforming the upper extremities of the core walls as indicated at 74. Again, the bed travel, press plate temperature and press dwell time are carefully selected and controlled to achieve the desired result.

Figure 9:
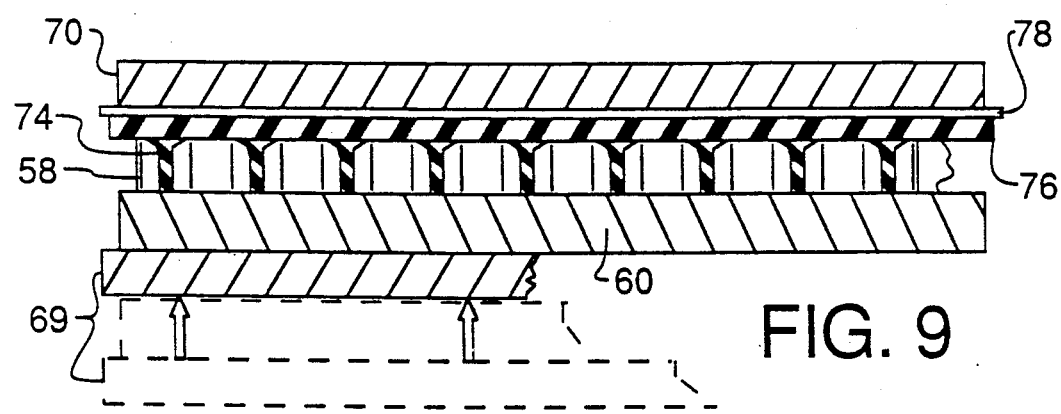

After the first planarizing operation is complete, and while the core is still warm, the teflon sheet 72 is removed, and a sheet of facing material is placed over the planarized core surface as indicated in FIG. 9. In one preferred embodiment, the facing material is comprised of a 0.020 inch thick sheet of clear glossy thermoplastic polyurethane (polyether type). After sheet 76 is placed upon core 58, a 5 mil teflon cover 78 is placed over the facing 76, and the bed 69 is again moved upwardly causing sheet 78 to engage plate 70 and transmit heat and pressure to the interface between the flattened core wall tops 74 of core 58 and sheet 78, causing the two to be thermal compression bonded together.

Subsequently, the single faced core assembly is stripped from the spreader plate 60, inverted and placed on another flat plate, positioned beneath press 70, and the operations illustrated in FIGS. 8 and 9 are repeated to planarize the second side of core 58, and then affix a second 15 mil facing sheet to the second side.

In order insure proper cooling and to maintain planarization of the bonded surfaces, a flat cooling plate may be placed atop the panel following each facing bonding operation and left in place for a predetermined period. Alternatively, a weighted plate may be rubbed several times across the heated surface to achieve the same result.

Figure 10:
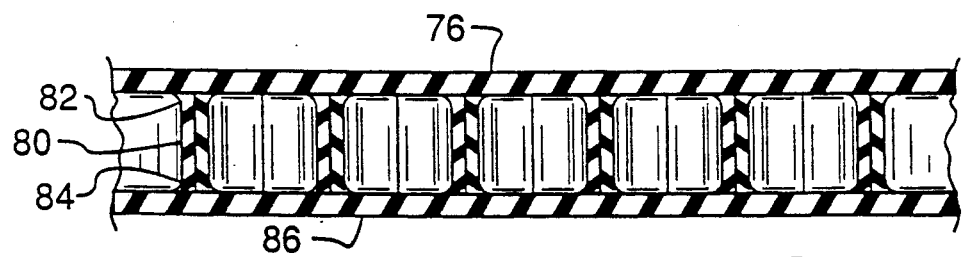
FIG. 10 is a partial cross section taken through the device illustrated in FIG. 1 to illustrate the structural characteristics of one example of a resulting panel.
Figure 11:
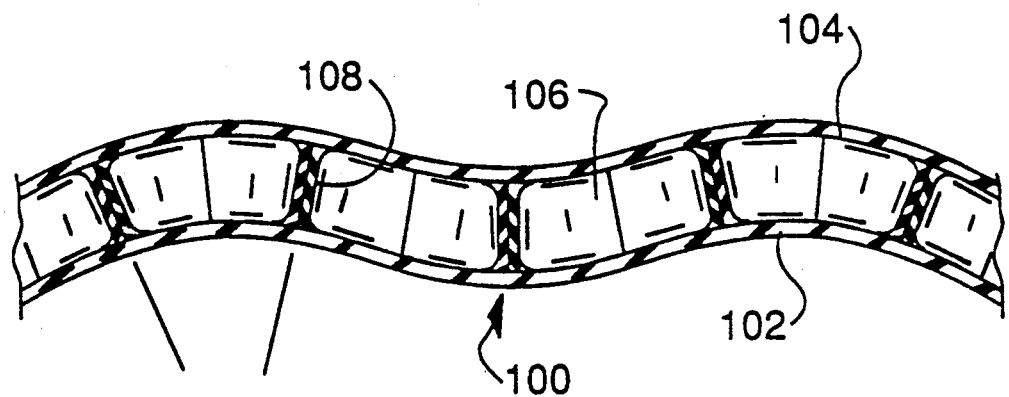
FIGS. 11 through 13 are cross sections illustrating alternative panel characteristics in accordance with the present invention.

At this point, the panel assembly is complete and ready for trimming and final inspection, and may resemble that depicted in FIG. 1. It will have a cross sectional configuration such as that depicted in FIG. 10, which is a cross section taken along the line 10—10 of FIG. 1. As indicated, each wall of the core will have a structure which resembles an I-beam, as indicated at 80, the upper and lower extremities 82 and 84 of which are firmly bonded to the facing sheets 76 and 86. In addition, as shown in FIG. 1, each cell will be formed of four generally S-shaped vertical wall segments 88 joined together with two wall segments 90 and 92 of double thickness. With the top and bottom edges of these walls bonded to the upper and lower facing sheets 14 and 16 a unitary honeycomb panel is provided with no seams or separations. Because of the high integrity of the bonds between the core and facing sheets, the anisotropic features of the structure will be uniform and predictable. As a consequence, all of the advantages mentioned above will be inherent in the panel.

Figure 12:
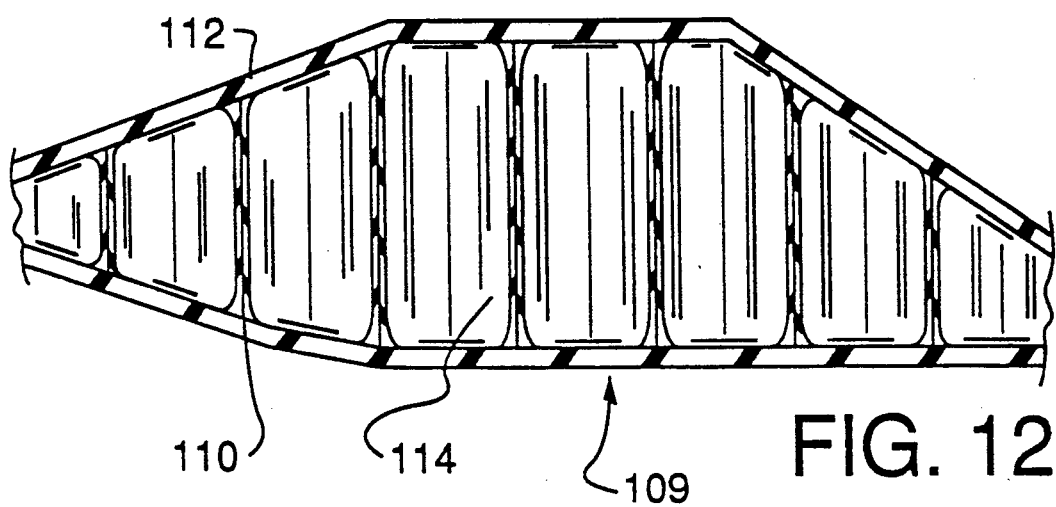

An additional feature of the present invention is that the honeycomb panels are not limited to planar configurations. For example, the panels may be made in a curved or serpentine configuration by merely changing the shape of the press plates used to bond the facing sheets 102 and 104 to the core 106. The core described above is particularly well suited to such applications because the cell walls 108 will tend to assume a radial orientation as the cores are deformed over the forming press plates. Similarly, cellular panels such as shown in FIG. 12 at 109 having varying thicknesses between facing sheets 110 and 112 may be provided in accordance with the present invention by merely trimming the upper and lower extremities of the expanded core 114 and tailoring the "planarizing" and sheet bonding presses to conform to the desired panel surface configuration.

Moreover, in accordance with the present invention apertures or slits (not shown) may be formed in one or both of the facing sheets to unseal the honeycomb cells. Also multiple facing sheets or laminated facing sheets may be bonded to a particular expanded core.

Figure 13:
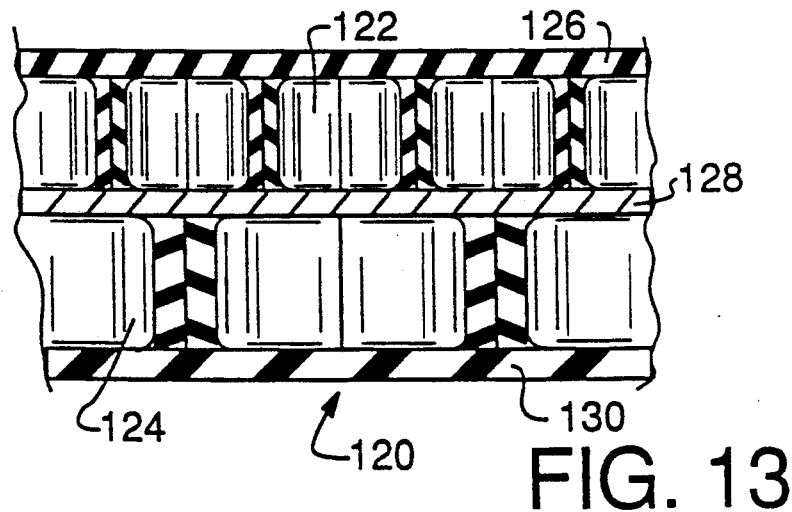

In addition, a multi-cored structure might be built up as depicted at 120 in FIG. 13, and such structure can include different core configurations 122 and 124 as well as different types of facing materials 126, 128 and 130.

It will of course also be appreciated that within a single core cell, dimensions may be varied by changing the dimensions and/or spacings of the bonding ribs used during the build up of the core stack.

Although several preferred embodiments of the method of the present invention have been described above, it will be understood that alterations and modifications thereof will likely be apparent to those skilled in the art after having read the detailed disclosure. Accordingly, it is intended that the following claims be interpreted as covering all such alterations and modifications as fall within the true spirit and scope of the invention.

What is claimed is:

1. A process for manufacturing a flexible honeycombed panel having anisotropic characteristics comprising the steps of:
- thermal compression bonding together a plurality of sheets of plastic material to form a laminated block wherein bonds between adjacent sheets are along regularly spaced rows with the bond rows between alternating sheets being laterally offset relative to the bond rows between the other sheets;
- cutting a core strip from said block by severing the block along a plane intersecting the block normal to both the length of the bond rows and the surfaces of each said sheet;
- expanding said core strip to form a honeycomb shaped core having cells of a particular configuration; and
- thermal compression bonding sheets of resilient facing material to opposite sides of said core by simultaneously applying heat and pressure to the joinder of said facing and said core.

2. A process as recited in claim 1 and further comprising the step of planarizing the upper and lower edges of the side walls of each said cell before thermal compression bonding said facing sheets thereto.

3. A process as recited in claim 2 wherein said core strip is expanded by pulling the laminated sheet portions forming the outside surface of said core strip in opposite directions and maintaining said core strip in expanded form by hooking cells along at least two opposite edges thereof over spreader pins disposed on opposite sides of a spreader block.

4. A process as recited in claim 2 wherein following planarization of both sides of said expanded core strip, the vertical cross section of each cell wall thereof is generally I-shaped.

5. A process as recited in claim 1 wherein said expanded core strip is planarized by subjecting at least one side thereof to heat and compression forces, with the result that the engaged core surfaces are deformed from their original configuration.

6. A resilient, honeycombed panel having anisotropic flexing characteristics comprising:
- a honeycomb core formed of undulated strips of thermoplastic material, thermal compression bonded together to form cells, said core being thermally compressed such that the upper and lower edges of each cell wall conform to a predetermined boundary shape; and
- first and second facing sheets of resilient material, thermal compression bonded to the respective upper and lower surfaces of said core formed by said upper and lower edges of each said cell by simultaneously applying heat and pressure to the joinder of said facing sheets and said core.

7. A resilient honeycombed panel as recited in claim 6 wherein each wall of said core has a vertical cross section which is generally I-shaped in configuration.

8. A resilient honeycombed panel as recited in claim 6 wherein each said cell includes four generally S-shaped wall segments each of which is shared with an adjacent cell.

9. A resilient honeycombed panel as recited in claim 6 wherein each said cell is of identical configuration.

10. A resilient honeycombed panel as recited in claim 6 wherein at least one of said upper and lower core surfaces is non-planar.

11. A resilient honeycombed panel as recited in claim 6 wherein said upper and lower core surfaces lie in parallel planes.

12. A resilient honeycombed panel as recited in claim 6 wherein each said cell is hermetically sealed.

* * * * *